US012664755B2

(12) United States Patent
Jun et al.

(10) Patent No.: US 12,664,755 B2
(45) Date of Patent: Jun. 23, 2026

(54) METHOD, SYSTEM AND NON-TRANSITORY COMPUTER-READABLE RECORDING MEDIUM FOR ANALYZING FASHION ATTRIBUTES OF IMAGE DATA GROUP USING LARGE IMAGE DATA

(71) Applicant: MUSINSA Co., Ltd., Seoul (KR)

(72) Inventors: Jae Young Jun, Seoul (KR); Jun Cheol Park, Seoul (KR); Yun Hun Jang, Seoul (KR); Hyung Won Choi, Seoul (KR)

(73) Assignee: MUSINSA Co., Ltd., Seoul (KR)

( * ) Notice: Subject to any disclaimer, the term of this patent is extended or adjusted under 35 U.S.C. 154(b) by 511 days.

(21) Appl. No.: 18/212,901

(22) Filed: Jun. 22, 2023

(65) Prior Publication Data

US 2024/0037912 A1 Feb. 1, 2024

(30) Foreign Application Priority Data

Jul. 28, 2022 (KR) ........................ 10-2022-0093864

(51) Int. Cl.
| | |
|---|---|
| *G06V 10/764* | (2022.01) |
| *G06T 7/11* | (2017.01) |
| *G06T 7/50* | (2017.01) |
| *G06T 7/90* | (2017.01) |
| *G06V 20/70* | (2022.01) |

(52) U.S. Cl.
CPC .............. *G06V 10/764* (2022.01); *G06T 7/11* (2017.01); *G06T 7/50* (2017.01); *G06T 7/90* (2017.01); *G06V 20/70* (2022.01); *G06T 2207/10024* (2013.01); *G06T 2207/30242* (2013.01); *G06V 2201/07* (2022.01)

(58) Field of Classification Search
CPC .. G06V 10/764; G06V 20/70; G06V 2201/07; G06T 7/11; G06T 7/50; G06T 7/90; G06T 2207/10024; G06T 2207/30242; G06Q 10/087; G06Q 30/0629; G06Q 30/0601; G06Q 30/0201; G06Q 50/10; G06F 16/55; G06F 16/58; G06F 16/64; G06N 20/00
See application file for complete search history.

(56) References Cited

U.S. PATENT DOCUMENTS

| | | | |
|---|---|---|---|
| 12,169,859 B1 * | 12/2024 | Lorbert | .............. G06Q 30/0627 |
| 2015/0227972 A1 * | 8/2015 | Tang | ................. G06Q 30/0255 |
| | | | 705/14.53 |
| 2017/0103405 A1 * | 4/2017 | Yonaha | ................. G06Q 30/06 |
| 2022/0207587 A1 * | 6/2022 | Yang | ........................ G06N 3/08 |
| 2025/0139951 A1 * | 5/2025 | Perla | .................... G06V 10/235 |

FOREIGN PATENT DOCUMENTS

| | | |
|---|---|---|
| KR | 101231946 B1 | 2/2013 |

* cited by examiner

*Primary Examiner* — Phuoc Tran
(74) *Attorney, Agent, or Firm* — Dinsmore & Shohl LLP; Yongsok Choi, Esq.

(57) ABSTRACT

A method for analyzing fashion attributes using large amounts of pieces of image data is provided. The method includes: collecting image data including at least one item; statistically analyzing on the image data based on an attribute classification AI model; and visualizing the results of the statistical analysis, wherein the attribute classification AI model is a model for detecting said at least one item included in the image data, and for recognizing, labeling and classifying fashion attributes of the at least one item.

7 Claims, 5 Drawing Sheets

<u>100</u>

<u>130</u>

Related attribute status

METHOD, SYSTEM AND NON-TRANSITORY COMPUTER-READABLE RECORDING MEDIUM FOR ANALYZING FASHION ATTRIBUTES OF IMAGE DATA GROUP USING LARGE IMAGE DATA

CROSS-REFERENCE TO RELATED APPLICATION

This application claims priority to Korean Patent Application No. 10-2022-0093864 filed on Jul. 28, 2022, the entire contents of which are herein incorporated by reference.

TECHNICAL FIELD

The present disclosure relates to a method, a system, and a non-transitory computer-readable recording medium for analyzing fashion attributes of an image data group using large amounts of pieces of image data. Specifically, the present disclosure relates to a method, a system, and a non-transitory computer-readable recording medium for statistically analyzing fashion items included in the group as articles by attribute for an image data group selectively configured using large amounts of pieces of image data.

BACKGROUND

Recently, the online market has increased its share of the total retail sales market. In the online marketplace, sellers may analyze consumer's spending patterns and create marketing strategies for high-demand products to promote sales.

Especially, in industries related to fashion products, the sales of products may be sensitive to changes in seasons, trends, and the like. Therefore, it is important for sellers to analyze and respond to these changes in trends. In addition to analyzing trends in the overall market, sellers should also analyze their own products and analyze consumer's buying trends.

In order to analyze the products for sale, it is necessary to classify each product by categories and attributes. In this regard, technology research and development is being conducted on how to classify and analyze product information for sale.

For example, Korean Patent No. 10-1231946 discloses a product sales and business management system using a coordination system to classify product information such as clothing, accessories, and miscellaneous goods by category, and to store and analyze product information such as brand, price, size, color, style, and shopping site. In the above-related art, information on the collected products is classified into categories, and each information on the products is input and stored to analyze the products.

However, there are limitations to input and analyze product information individually for large amounts of pieces of image data, and it takes a lot of time and costs to classify and analyze products according to various attributes.

Therefore, the inventors of the present disclosure propose a service capable of classifying and analyzing products in accordance with various attributes for a fashion item album composed by a user by combining arbitrary fashion items with large amounts of pieces of image data.

SUMMARY

One object of the present disclosure is to solve all the above-described problems.

Another object of the present disclosure is to provide statistical analysis of large amounts of pieces of image data based on AI models and visualization of the results.

Yet another object of the present disclosure is to provide statistical analysis and visualization of fashion items included in an image data group composed of predetermined criteria by each attribute, based on an AI model.

Representative configurations of the present disclosure to achieve the above objects are described below.

According to one aspect of the present disclosure, there is provided a method of analyzing fashion attributes using large amounts of pieces of image data, comprising: collecting image data including at least one item; performing statistical analysis for the image data based on an attribute classification AI model; and visualizing the results of the statistical analysis. The attribute classification AI model is a model for detecting said at least one item included in the image data, and for recognizing, labeling and classifying fashion attributes of the at least one item.

According to one embodiment of the present disclosure, in the step of collecting the image data, the image data is input and collected from a user terminal or a predetermined database.

According to one embodiment of the present disclosure, the step of statistically analyzing the image data based on the attribute classification AI model may include statistically analyzing the at least one item included in each of the collected image data by classifying the item by attribute. The attribute may include at least one of category, color, material, fit, print, style, shape, detail, neckline, and sleeve length.

According to one embodiment of the present disclosure, the statistical analysis may include counting the number of items corresponding to the item by the attributes and comparing and analyzing the proportions of the item by the attributes.

According to one embodiment of the present disclosure, the step of statistically analyzing the image data based on the attribute classification AI model may include performing the analysis at a predetermined interval and storing the analysis results.

According to one embodiment of the present disclosure, the step of visualizing the results of the statistical analysis may include providing at least one of a count of items or a graph corresponding to a sub-item by attribute for the at least one item included in each of the image data.

According to one embodiment of the present disclosure, the step of visualizing the results of the statistical analysis may include visualizing and providing a proportion of each sub-item within an attribute for the at least one item included in each of the image data.

According to one embodiment of the present disclosure, the method may further include organizing an album by dividing the image data into predetermined criteria. In the step of statistically analyzing the image data based on the attribute classification AI model, the image data included in the album is statistically analyzed based on the attribute classification AI model.

A fashion attribute analysis system using large amounts of pieces of image data according to one embodiment of the present disclosure includes: an image data collection unit configured to collect image data including at least one item; a data statistical analysis unit configured to statistically analyze the image data based on an attribute classification AI model; and a visualization processing unit configured to generate visualization data as a result of the statistical analysis.

In addition, there are further provided other methods and systems to implement the present disclosure, as well as non-transitory computer-readable recording media having stred thereon computer programs for performing the methods.

According to the present disclosure, the large amounts of pieces of image data may be statistically analyzed based on an AI model and the results may be visualized and provided.

Further, according to the present disclosure, fashion items included in a image data group composed of predetermined criteria may be provided by statistically analyzing and visualizing each attribute based on an AI model.

DETAILED DESCRIPTION

Hereinafter, embodiments of the present disclosure will be described in detail with reference to the accompanying drawings. In the following, specific descriptions of functions and configurations already known in the art are omitted if it is deemed that they may unnecessarily obscure the essence of the present disclosure. In addition, it is to be understood that the following description relates merely to one embodiment of the present disclosure and is not intended to limit the present disclosure.

The terms used in the present disclosure are used merely to describe specific embodiments and are not intended to limit the present disclosure. For example, a component expressed in the singular is to be understood as including a plurality of components unless the context clearly indicates that the singular is intended. It is to be understood that the term "and/or" as used in this disclosure is intended to encompass any and all possible combinations of one or more of the enumerated items. The terms "include" or "have" as used in the present disclosure are intended merely to designate the presence of the features, numbers, operations, components, parts, or combinations thereof described herein, and the use of such terms is not intended to exclude the possibility of the presence or addition of one or more other features, numbers, operations, components, parts, or combinations thereof.

In some embodiments of the present disclosure, a 'module' or 'unit' refers to a functional unit that performs at least one function or operation, and may be implemented in hardware or software, or a combination of hardware and software. Furthermore, a plurality of 'modules' or 'units' may be integrated into at least one software module and implemented by at least one processor, with the exception of 'modules' or 'units' that need to be implemented in specific hardware.

Further, unless otherwise defined, all terms used in this disclosure, including technical or scientific terms, may have the same meaning as commonly understood by one of ordinary skill in the art to which the present disclosure belongs. It is to be understood that commonly used dictionary-defined terms should be construed to have a meaning consistent with their contextual meaning in the relevant art and are not to be construed as unduly limiting or expanding unless expressly defined otherwise in the present disclosure.

Hereinafter, a method for analyzing fashion attributes according to one embodiment of the present disclosure will be described in detail with reference to the following drawings.

Figure 1:
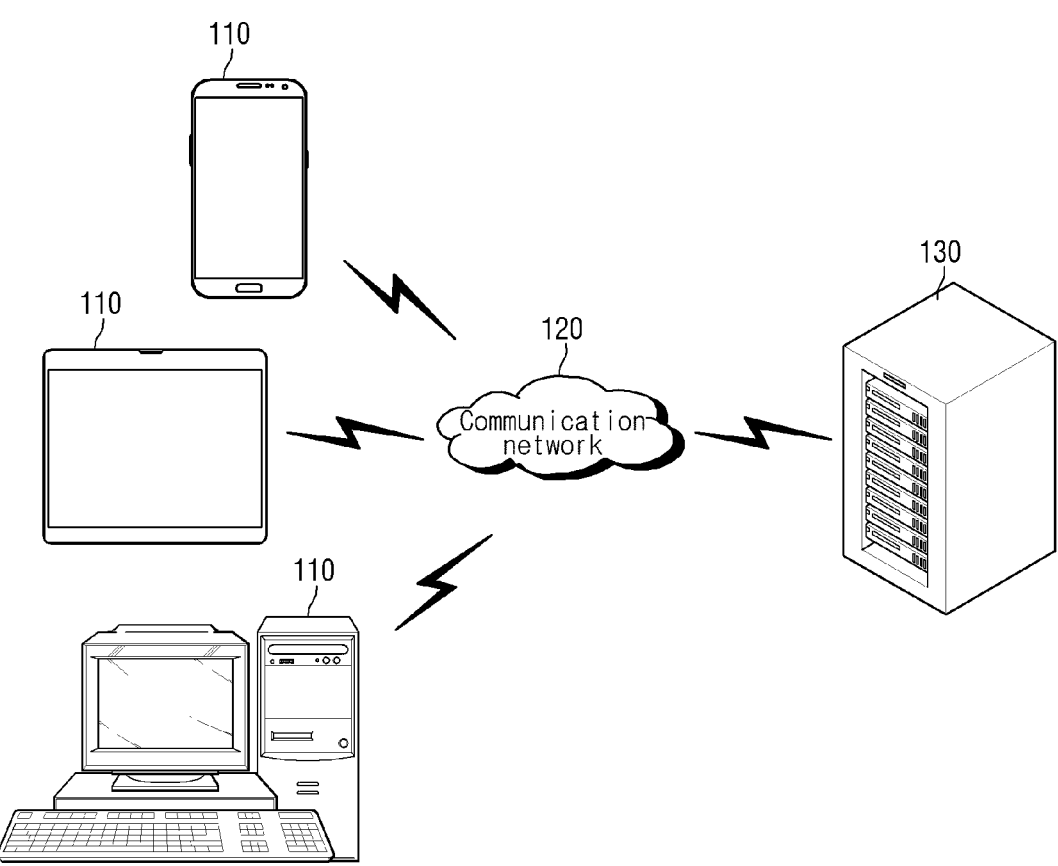
FIG. 1 illustratively show a schematic configuration of a fashion attribute analysis system environment according to one embodiment of the present disclosure.

FIG. 1 illustratively shows a schematic configuration of a fashion attribute analysis system environment according to one embodiment of the present disclosure.

As shown in FIG. 1, a fashion attribute analysis system 100 according to one embodiment of the present disclosure may include a user terminal 110, a communication network 120, and a fashion attribute analysis server 130.

The user terminal 110, according to one embodiment of the present disclosure, is a digital device that includes the capability to access and communicate with the fashion attribute analysis server 130 via a communication network 120. It may be a portable digital device having memory means and computing capability by means of a microprocessor, such as a smartphone, tablet PC, or the like, and is not limited to any particular form. Three user terminals are illustrated in the present drawings, but the present disclosure is not limited thereto.

According to one embodiment of the present disclosure, various forms of user input received on the user terminal 110 may be communicated to the fashion attribute analysis server 130 via the communication network 120. According to one embodiment of the present disclosure, the user terminal 110 may receive various signals transmitted from an external source (e.g., the fashion attribute analysis server 130) via the communication network 120.

According to one embodiment of the present disclosure, the user terminal 110 may include an application to support functionality according to the present disclosure. Such an application may be downloaded from the fashion attribute analysis server 130 or an external application distribution server (not shown).

The communication network 120 according to one embodiment of the present disclosure may include any communication modality, such as wired communication or wireless communication, and may include various communication networks, such as a local area network (LAN), a metropolitan area network (MAN), or a wide area network (WAN). Preferably, the communication network 120 referred to herein may be the public Internet or the World Wide Web (WWW). However, the communication network 120 may also include, at least in part, a publicly available wired or wireless data communication network, a publicly available telephone network, or a publicly available wired or wireless television communication network, without necessarily being limited thereto.

For example, the communication network 120 may be a wireless data communication network implementing, at least in part, communication methods in the related art such as wireless fidelity (WiFi) communication, WiFi-Direct communication, Long Term Evolution (LTE) communication, Bluetooth communication (e.g., Bluetooth Low Energy (BLE) communication), infrared communication, ultrasonic communication, and the like.

The fashion attribute analysis server 130 according to one embodiment of the present disclosure may classify fashion items included in the predetermined image data by attributes, perform statistical analysis, and visualize and provide the results. In one embodiment of the present disclosure, the fashion attribute analysis server 130 may collect image data, statistically analyze fashion items, by the attributes, of each image data included in a image data group (hereinafter referred to as an "album") classified in accordance with predetermined criteria, and provide the results. In one embodiment, the fashion attribute analysis server 130 may provide numerical and graphical visualizations of the results of the statistical analysis of the fashion item. In one embodiment, the fashion attribute analysis server 130 may communicate with the user terminal 110 via the communication network 120, as shown.

In one embodiment of the present disclosure, the fashion attribute analysis server 130 may be a digital device having memory means and having computational power by means of a microprocessor. Such a fashion attribute analysis server 130 may be a server system.

Figure 2:
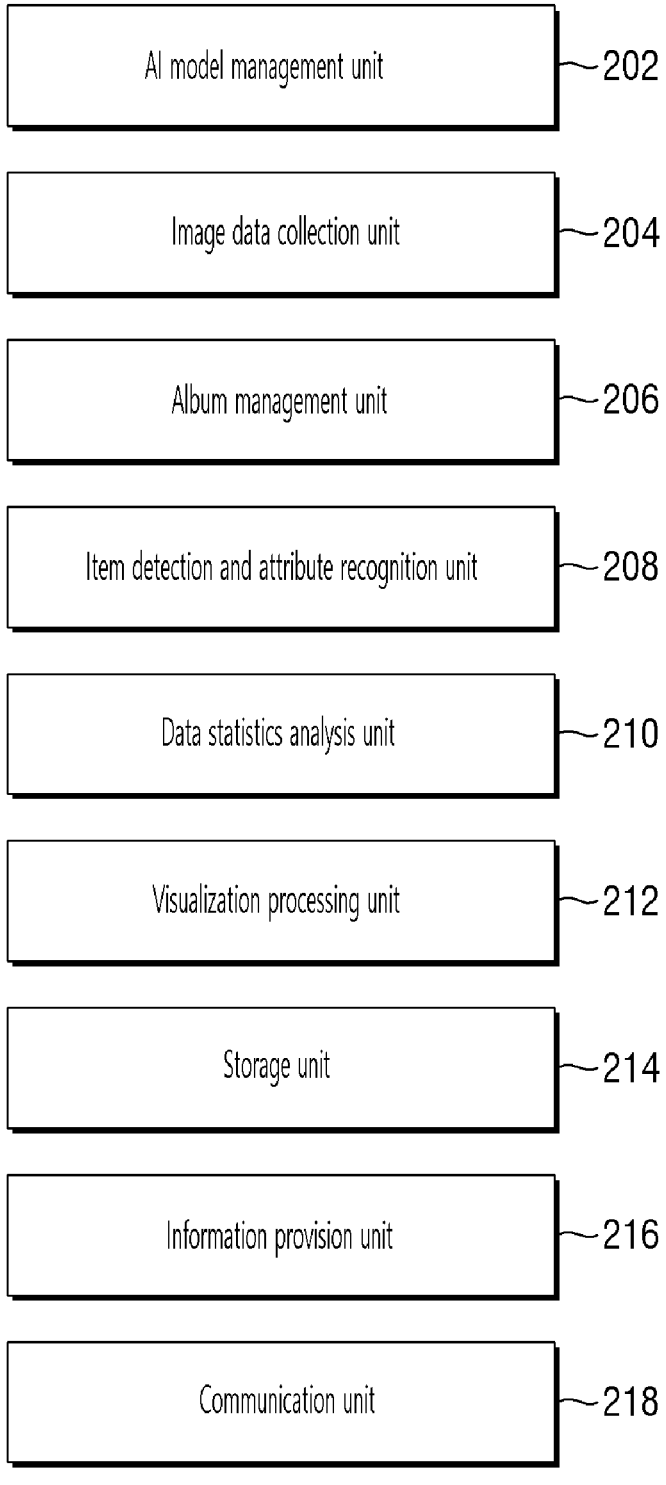
FIG. 2 is a functional block diagram schematically illustrating a functional configuration of a fashion attribute analysis server according to one embodiment of the present disclosure.

FIG. 2 is a functional block diagram schematically illustrating a functional configuration of a fashion attribute analysis server according to one embodiment of the present disclosure.

Referring to FIG. 2, the fashion attribute analysis server 130 may include an AI model management unit 202, an image data collection unit 204, an album management unit 206, an item detection and attribute recognition unit 208, a data statistics analysis unit 210, a visualization processing unit 212, a storage unit 214, an information provision unit 216, and a communication unit 218. The components illustrated in FIG. 2 are not exhaustive of the capabilities of the fashion attribute analysis server 130, nor are they essential, and the fashion attribute analysis server 130 may include more or fewer components than those illustrated.

According to one embodiment of the present disclosure, the AI model management unit 202, the image data collection unit 204, the album management unit 206, the item detection and attribute recognition unit 208, the data statistics analysis unit 210, the visualization processing unit 212, the storage unit 214, the information provision unit 216, and the communication unit 218 may be program modules, at least some of which communicate with an external system. Such program modules may be included in the fashion attribute analysis server 130 in the form of operating systems, application modules, or other program modules, and may be physically stored in various publicly available memory devices. Additionally, these program modules may be stored on a remote memory device that is in communication with the fashion attribute analysis server 130. Meanwhile, such program modules may include, but are not limited to, routines, subroutines, programs, objects, components, data structures, and the like that perform certain tasks to be described later in accordance with the present disclosure or that execute certain abstract data types.

According to one embodiment of the present disclosure, the AI model management unit 202 may perform a function of managing an AI model capable of recognizing and classifying attributes of a fashion item from image data. In one embodiment of the present disclosure, the AI model management unit 202 may generate an AI model or receive an externally generated training model. In one embodiment, the AI model management unit 202 may provide an attribute classification AI model capable of detecting fashion items in an image, recognizing and labeling attributes, to the item detection and attribute recognition unit 208.

According to one embodiment of the present disclosure, the image data collection unit 204 may perform a function of collecting predetermined image data. According to one embodiment of the present disclosure, the image data collection unit 204 may collect image data including at least one fashion item. In one embodiment, the image data collection unit 204 may collect image data including at least one fashion item from an online marketplace or social network system (SNS). Further, in one embodiment, the image data collection unit 204 may receive predetermined image data from the user terminal 110.

According to one embodiment of the present disclosure, the album management unit 206 may perform a function of managing an album. Here, an album is a storage space for collecting and storing image data, and the collected image data may be categorized by predetermined criteria and stored in the album. In one embodiment of the present disclosure, the album management unit 206 may create at least one album and may remove a created album. In one embodiment, the album management unit 206 may create or remove an album in response to input from the user terminal 110.

In one embodiment of the present disclosure, the album management unit 206 may receive input from the user terminal 110 to add and store image data to a predetermined album, or remove any image data stored in the album from the album. In one embodiment, the album management unit 206 may store all collected image data in one album. In one embodiment, the album management unit 206 may filter the collected image data by any condition and store it in an album. For example, the album management unit 206 may store image data collected from any online marketplace in one album. Further, the album management unit 206 may store image data collected over an arbitrary period of time in an album.

In one embodiment of the present disclosure, the item detection and attribute recognition unit 208 may perform a function of detecting fashion items in the image data, recognizing their attributes, and labeling them. In one embodiment of the present disclosure, the item detection and attribute recognition unit 208 may detect the location of a fashion item included in the image data, using an AI model. In one embodiment of the present disclosure, the item detection and attribute recognition unit 208 may recognize an attribute of the detected fashion item, using an AI model.

In one embodiment of the present disclosure, the item detection and attribute recognition unit 208 may recognize and label attributes of a fashion item included in the image data by using an attribute classification AI model provided by the AI model management unit 202. In one embodiment, if the fashion item is clothing, the relevant attributes may include category, color, material, fit, print, style, shape, detail, neckline, sleeve length, length, pattern, and the like. In one embodiment, if the fashion item is a shoe, the relevant attributes may include heel height, heel shape, forefoot shape, sole shape, and the like. Further, for bags, accessories, knickknacks, hats, or the others, the attributes may include their respective characteristic attributes.

In one embodiment of the present disclosure, the data statistics analysis unit 210 may perform a function of statistically analyzing the image data stored in the album by attribute. In one embodiment of the present disclosure, the data statistics analysis unit 210 may generate statistics by attribute and analyze them by using labeling of fashion items included in the image data in the album. In one embodiment, the data statistics analysis unit 210 may calculate the number of items corresponding to sub-items of each attribute among the image data in the album and analyze the image data included in the album by using the number of items. For example, the data statistics analysis unit 210 may calculate and compare the number of items per category of fashion items included in the image data in the album. In one embodiment, the data statistics analysis unit 210 may calculate the number of items corresponding to each sub-item by attribute (e.g., white, black, beige, gray, and the like as sub-items of color) in the image data included in any album, and analyze the image data included in that album as a proportion of each sub-item by attribute.

In one embodiment of the present disclosure, the data statistics analysis unit 210 may perform its function at a predetermined interval. In one embodiment, the data statistics analysis unit 210 may perform statistical analysis at a predetermined interval for albums to which continuously collected image data is added.

In one embodiment of the present disclosure, the visualization processing unit 212 may perform a function of visualizing and processing statistical analysis results. In one embodiment of the present disclosure, the visualization processing unit 212 may perform visualization processing of statistical analysis results for image data included in any album. In one embodiment, the visualization processing unit 212 may provide a figure indicating the number of items corresponding to a sub-item by attribute for the fashion items included in the image data of the corresponding album, based on the results of the analysis by the data statistics analysis unit 210. In one embodiment, the visualization processing unit 212 may provide bar graph information on the sub-items by attribute based on the results of the statistical analysis of the image data of the corresponding album. In one embodiment, the visualization processing unit 212 may visualize and provide a corresponding numerical or graphical representation of the proportion of each sub-item by attribute based on the results of statistical analysis of the image data of the corresponding album.

In one embodiment of the present disclosure, the storage unit 214 may perform a function of storing data required by the fashion attribute analysis server 130. The data stored in the storage unit 214 may include, for example, image data collected by the image data collection unit 204 and albums categorized and stored by the album management unit 206. In addition, the data stored in the storage unit 214 may include the results of statistical analysis of the image data in the album by the data statistics analysis unit 210 and the results of visualization processing by the visualization processing unit 212 based on the results of statistical analysis.

In one embodiment of the present disclosure, the information provision unit 216 may perform a function of providing a fashion attribute analysis result. In one embodiment, the information provision unit 216 may provide a result of a statistical analysis of the attributes of the fashion items included in the image data for each album. In one embodiment of the present disclosure, the information provision unit 216 may provide information to the user terminal 110 that visualizes the results of the statistical analysis of the attributes of the fashion items included in the image data for each album.

The communication unit 218 of the fashion attribute analysis server 130 according to one embodiment of the present disclosure performs a function to enable data transmission and reception from/to the AI model management unit 202, the image data collection unit 204, the album management unit 206, the item detection and attribute recognition unit 208, the data statistics analysis unit 210, the visualization processing unit 212, the storage unit 214, and the information provision unit 216.

Figure 3:
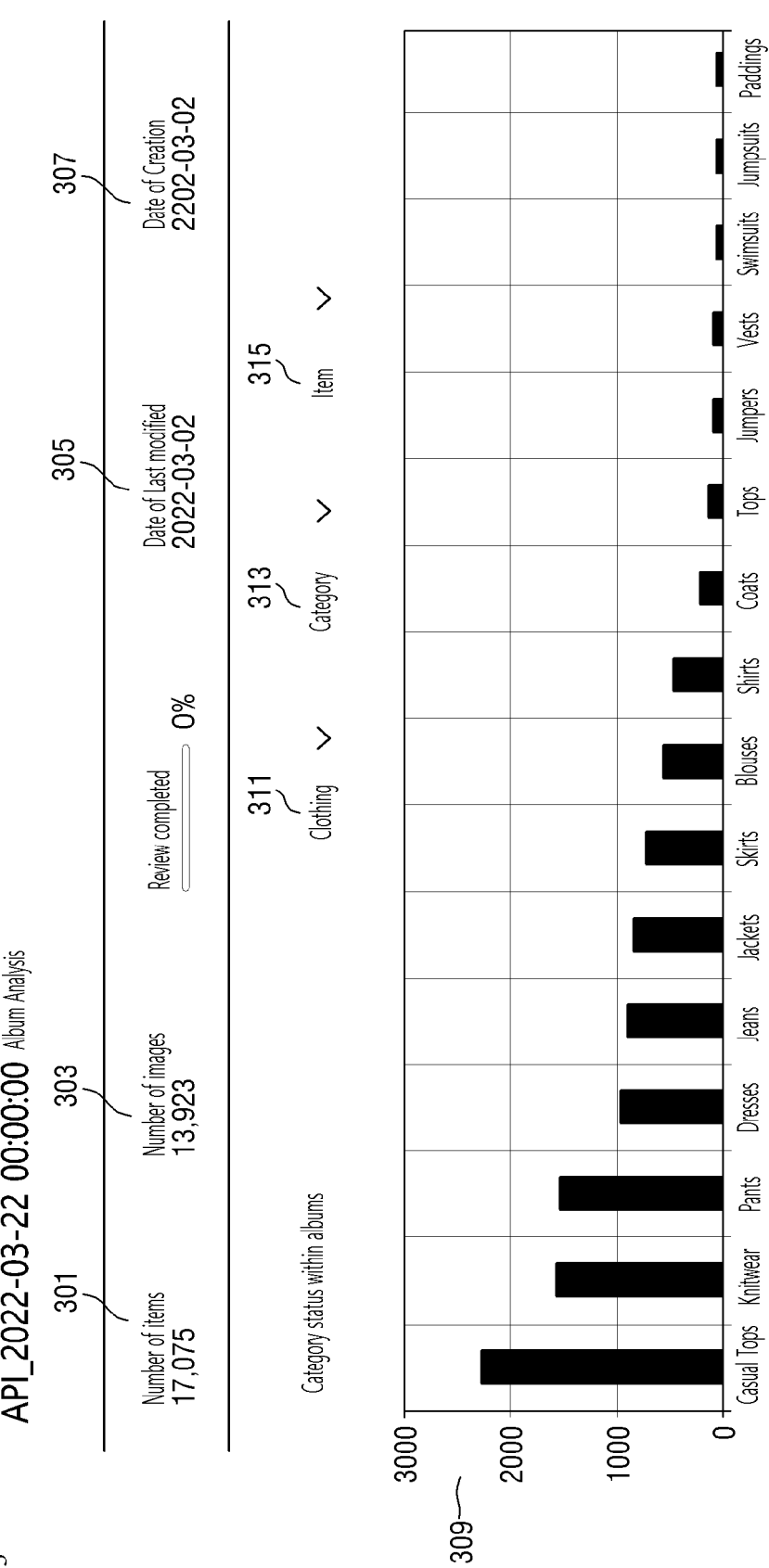
FIG. 3 is a graphical representation showing the results of a statistical analysis of attributes of fashion items in images included in an album according to one embodiment of the present disclosure.

FIG. 3 is a graphical representation showing the results of a statistical analysis of attributes of fashion items in images included in an album according to one embodiment of the present disclosure.

Referring to FIG. 3, the fashion attribute analysis server 130 may provide a display of the user terminal 110 with a number of items 301, a number of images 303, a modification date 305 and a creation date 307 of the album for the corresponding album. In one embodiment of the present disclosure, a single image may include a plurality of items, so the number of items 301 may be equal to or greater than the number of images 303. In one embodiment, a user may add, change and remove images in an album, and the fashion attribute analysis server 130 may perform a statistical analysis of attributes for the fashion items in the album at predetermined intervals or upon receiving input from the user. Accordingly, the fashion attribute analysis server 130 may provide the date of the last statistical analysis in that album as the album's modification date 305. Although not shown, the fashion attribute analysis server may further provide a history of previously performed statistical analyses.

According to one embodiment of the present disclosure, the fashion attribute analysis server 130 may provide a breakdown of each attribute of the fashion items in the album as a graph 309. In FIG. 3, the fashion attribute analysis server 130 provides a bar graph of the status of the categories in the album. The graph 309 in FIG. 3 may be used to visualize that the fashion items in the album are organized in the following order: casual tops, knitwear, pants, and dresses.

According to one embodiment of the present disclosure, the fashion attribute analysis server 130 may apply filters 311 to 315 to fashion items in an album to visualize and provide statistical analysis results. For example, in FIG. 3, a filter is applied to clothing 311 and category 313 to provide category analysis results for clothing among the fashion items in the album. In addition, statistical analysis results may be provided for items such as shoes, bags, accessories, miscellaneous goods, and the like by category, color, material, and the like.

Figure 4:
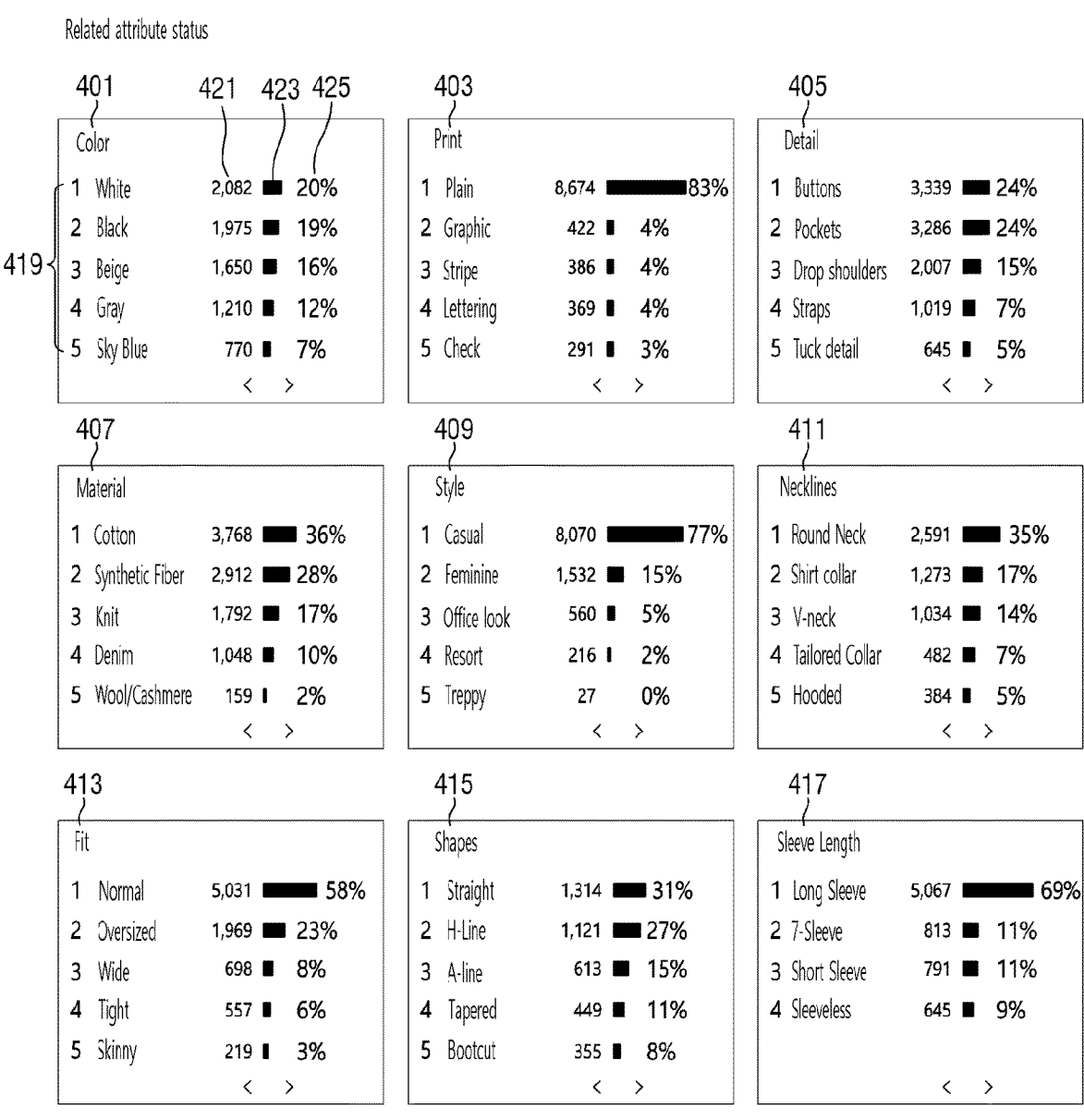
FIG. 4 is a diagram illustrating the status of fashion items of images included in an album by attributes according to one embodiment of the present disclosure.

FIG. 4 is a diagram illustrating the status of fashion items of images included in an album by attributes according to one embodiment of the present disclosure.

Referring to FIG. 4, the fashion attribute analysis server 130 provides an overall status of relevant attributes for the fashion items in the album. In one embodiment of the present disclosure, the fashion attribute analysis server 130 may provide top-ranked sub-items for each attribute. FIG. 4 provides the five most common sub-items 419 that the items in the corresponding album fall into for color 401, print 403, detail 405, material feel 407, style 409, neckline 411, fit 413, shape 415, and sleeve length 417, and provides the number of items 421 corresponding to each sub-item and the proportion of the sub-item within each attribute as a graph 423 and a percentage 425. For example, the fashion attribute analysis server 130 provides a visualization that the album includes items colored in the following order: white, black, beige, gray, and sky blue, of which white accounts for 20%.

Figure 5:
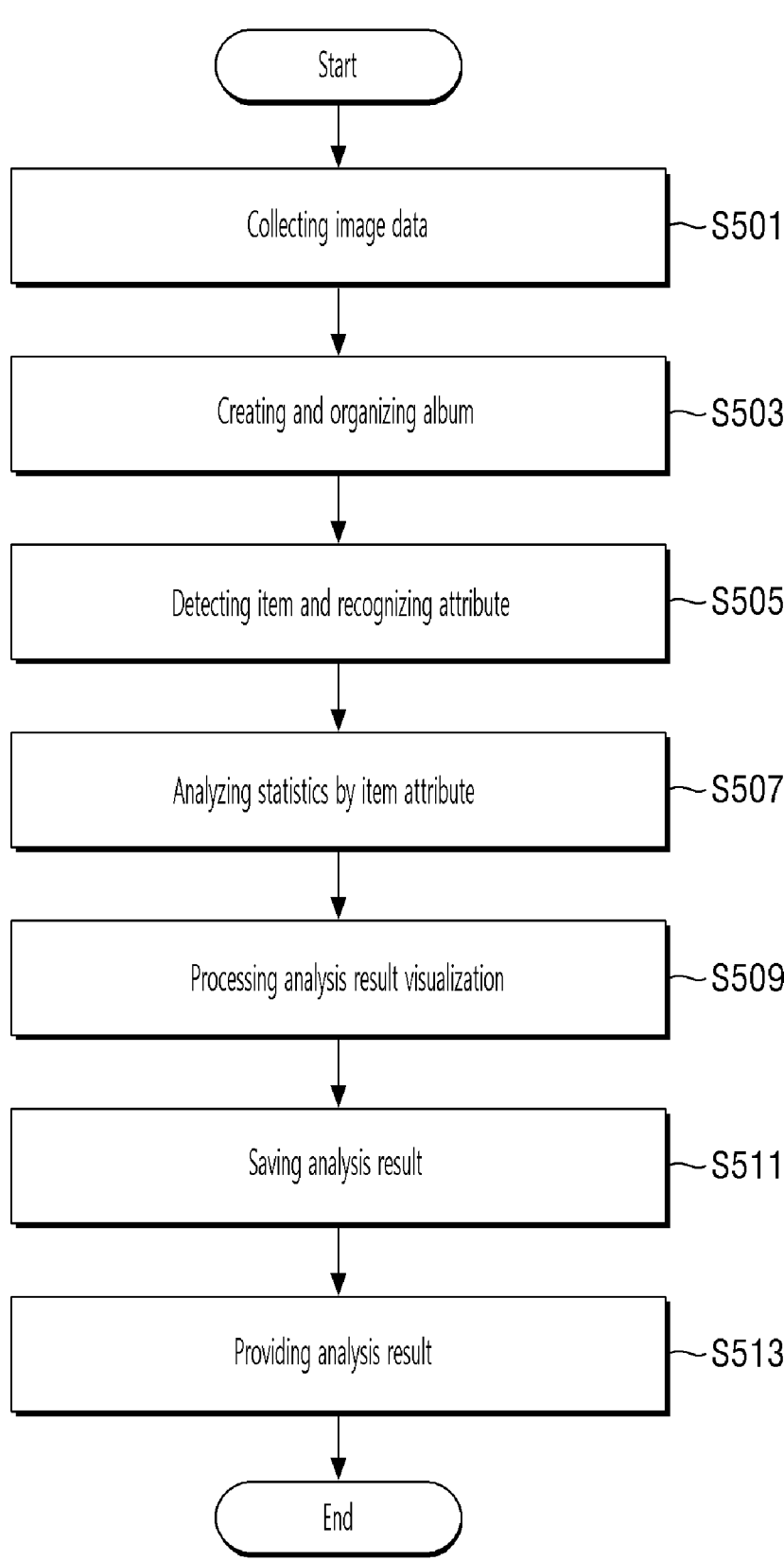
FIG. 5 is a flowchart illustrating a process of analyzing fashion attributes according to one embodiment of the present disclosure.

FIG. 5 is a flowchart illustrating a process of analyzing fashion attributes according to one embodiment of the present disclosure.

First, in a step S501, the fashion attribute analysis server 130 collects image data. In one embodiment, the fashion attribute analysis server 130 may collect image data including at least one fashion item from an online marketplace or a social network system (SNS).

In a step S503, the fashion attribute analysis server 130 may create an album and store the collected image data in the album according to the predetermined criteria to construct the album. In one embodiment, the fashion attribute analysis server 130 may store the predetermined image data in an album by receiving input from the user terminal 110. In an embodiment, one album may store all the collected image data, or the step S503 may be omitted and the following steps may be performed for all the collected images.

Next, in a step S505, the fashion attribute analysis server 130 may detect a fashion item from the image data in the album and recognize an attribute of the detected item. In one embodiment of the present disclosure, the fashion attribute analysis server 130 may detect the items in the image data in the album, recognize the attributes, and label the items by using an attribute classification AI model.

In a step S507, the fashion attribute analysis server 130 performs statistical analysis by attribute using the attribute labeling of the fashion items in the image data. In one embodiment of the present disclosure, the fashion attribute analysis server 130 may calculate the number of items corresponding to each attribute sub-item among the image data in the album and perform the statistical analysis using it. In one embodiment, the fashion attribute analysis server 130 may perform statistical analysis by item attribute at a predetermined interval for an album to which image data is continuously added.

In a step S509, the fashion attribute analysis server 130 performs visualization processes for the statistical analysis result. In one embodiment, the fashion attribute analysis server 130 may perform visualization process for figures, proportions, and graphs of sub-items by attributes and the like for the fashion items included in the image data of the corresponding album based on the statistical analysis results.

Next, in a step S511, the fashion attribute analysis server 130 stores the analysis results. In one embodiment, the fashion attribute analysis server 130 may store the results of statistical analysis performed and visualization processing results thereof.

Finally, in a step S513, the fashion attribute analysis server 130 provides the analysis results. In one embodiment, the fashion attribute analysis server 130 may provide the user terminal 110 with the results of statistical analysis of the image data in the album and the results of visualization processing thereof.

As such, the fashion attribute analysis server 130 may collect image data including fashion items, construct an album by receiving input from a user, perform statistical analysis by attribute on the entire image data included within the album, visualize it, and provide it to the user terminal 110. By doing so, the user may figure out the overall trend of the items included in the album and may utilize the analysis results in various ways depending on how the album is organized. In one embodiment, an operator of a shopping mall in an online marketplace may use the fashion attribute analysis server 130 to conduct market research for a specific time period, analyze competitor products, or analyze their own portfolio. It may also be used by users to analyze fashion trends for specific sources that they want, or for specific segments. In addition, a user who uses online shopping may also store images of products in a style he or she wants in an album, or store images of purchased products in an album to analyze his or her consumption trends. In particular, the fashion attribute analysis server 130 may provide statistical analysis results of attributes by visualizing them in a graph or the like to help users intuitively identify fashion trends.

In the embodiments of the present disclosure described above with reference to the drawings (and throughout this specification), the user terminal 110 and the fashion attribute analysis server 130 are illustrated as being implemented based on a client-server model. Particularly, the client primarily provides user input and output functions and most other functions (particularly many functions related to fashion attribute analysis) are delegated to the server, but the present disclosure is not limited thereto. It is to be appreciated that, according to other embodiments of the present disclosure, the fashion attribute analysis system environment may be implemented with its functionality evenly distributed between the user terminal and the server, or it may be implemented more dependent on the application environment installed on the user terminal. Furthermore, it is to be understood that when the functions of the fashion attribute analysis system are implemented by distributing them between user terminals and servers according to one embodiment of the present disclosure, the distribution of each function of the similar product search system between clients and servers may be implemented differently in accordance with embodiments. It is to be appreciated that, according to one embodiment of the present disclosure, the main functions of the fashion attribute analysis server may be implemented and provided on each user terminal 110 rather than on the fashion attribute analysis server 130.

Further, in the foregoing embodiments of the present disclosure, it is described as certain modules performs certain actions for convenience, but the present disclosure is not limited thereto. It is to be appreciated that in other embodiments of the present disclosure, each of the operations described above as being performed by a particular module may be performed by a different, separate module.

The programs executed by the terminals and servers described in the present disclosure may be implemented as hardware components, software components, and/or a combination of hardware components and software components. The programs may be executed by any system capable of executing computer-readable instructions.

Software may include computer programs, code, instructions, or one or more combinations thereof, and may compose processing devices to operate as desired, or may independently or collectively instruct processing devices. The software may be implemented as a computer program including instructions stored on computer-readable storage medium. Computer-readable storage media may include, for example, magnetic storage media (e.g., read-only memory (ROM), random-access memory (RAM), floppy disks, hard disks, and the like) and optical-readable medium (e.g., CD-ROM, digital versatile disc (DVD)). A computer-readable recording medium may be distributed across networked computer systems so that computer-readable code may be stored and executed in a distributed manner. The medium is readable by a computer and may be stored in memory and executed by a processor.

A computer-readable storage medium may be provided in the form of a non-transitory storage medium. In this context, 'non-transitory' means that the storage medium does not contain signals and is tangible, and does not distinguish whether the data is stored on the storage medium on a semi-permanent or temporary basis.

Further, programs according to embodiments of the present disclosure may be provided in a computer program product. The computer program may be traded between a seller and a buyer as a commodity. A computer program may include a software program and a computer-readable storage medium on which the software program is stored. For example, a computer program may include a product (e.g., a downloadable application) in the form of a software program that is distributed electronically by a device manufacturer or through an electronic marketplace (e.g., Google Play Store, App Store). For electronic distribution, at least a portion of the software program may be stored on a storage medium or may be temporarily generated. In this case, the storage medium may be the storage medium of a manufacturer's server, an e-marketplace's server, or a relay server that temporarily stores the software program.

In a system including a server and a device, the computer program may include a storage medium of the server or a storage medium of the device. Alternatively, in the presence of a third device (e.g., a smartphone) in communication with the server or the device, the computer program may include a storage medium of the third device. Alternatively, the computer program may include the software program itself that is transmitted from the server to the device or third device, or from the third device to the device. In this case, one of the server, the device, and the third device may execute the computer program to perform the methods according to the disclosed embodiments. Alternatively, two or more of the server, the device, and the third device may execute the computer program to distributedly perform the methods of the disclosed embodiments. For example, a server may execute a computer program stored on the server to control a device in communication with the server to perform methods according to disclosed embodiments. In another example, a third device may execute a computer program to control a device in communication with the third device to perform a method according to a disclosed embodiment. When the third device executes the computer program, the third device may download the computer program from a server and execute the downloaded computer program. Alternatively, the third device may execute a computer program that is provided pre-loaded to perform the methods of the disclosed embodiments.

Although embodiments have been described above by way of limited embodiments and drawings, one of ordinary skill in the art will recognize that various modifications and variations are possible from the above description. For example, suitable results may be achieved if the described techniques are performed in a different order from the methods described, and/or if components of the described computer systems, modules, and the like are combined or assembled in a different form from the methods described, or if other components or equivalents are substituted or replaced.

What is claimed is:

1. A method for analyzing fashion attributes using large amounts of pieces of image data, comprising the steps of:
    collecting image data including at least one item;
    generating at least one album by dividing the image data based on at least one of a collection source and a collection period;
    generating location information of a fashion item for each of the image data included in the at least one album by using an attribute classification AI model, and recognizing and labeling an attribute of the fashion item corresponding to the generated location information;
    calculating, based on the labeled attributes, the number of items corresponding to each sub-item of each attribute among the image data included in the album and a proportion of each sub-item within the corresponding attribute; and
    visualizing analysis results including the calculated number of items and the proportion of each sub-item within the corresponding attribute,
    wherein the attribute classification AI model is a model for detecting the at least one item included in the image data, and for recognizing, labeling and classifying fashion attributes of the at least one item.

2. The method of claim 1, wherein in the step of collecting the image data, the image data is input and collected from a user terminal or a predetermined database.

3. The method of claim 1,
    wherein the attribute includes at least one of category, color, material, fit, print, style, shape, detail, neckline, and sleeve length.

4. The method of claim 1, wherein the step of calculating, based on the labeled attributes, the number of items corresponding to each sub-item of each attribute among the image data included in the album and a proportion of each sub-item within the corresponding attribute comprises performing the analysis at a predetermined interval and storing the analysis results.

5. The method of claim 1, wherein the step of visualizing analysis results including the calculated number of items and the proportion of each sub-item within the corresponding attribute comprises providing at least one of a number of items or a graph corresponding to a sub-item by attribute for the at least one item included in each of the image data.

6. A non-transitory computer-readable recording medium having stored thereon a computer program for executing a method of claim 1.

7. A fashion attribute analysis server using large amounts of pieces of image data, comprising:
    a memory storing at least one instruction; and
    at least one processor configured to be connected with the memory, wherein the at least one processor executes the at least one instruction to:
    collect image data including at least one item;
    generate at least one album by dividing the image data based on at least one of a collection source and a collection period;
    generate location information of a fashion item for each of the image data included in the at least one album by using an attribute classification AI model, and recognize and label an attribute of the fashion item corresponding to the generated location information;
    calculate, based on the labeled attributes, the number of items corresponding to each sub-item of each attribute among the image data included in the at least one album and a proportion of each sub-item within the corresponding attribute; and
    generate visualization data including the calculated number of items and the proportion of each sub-item within the corresponding attribute,
    wherein the attribute classification AI model is a model for detecting the at least one item included in the image data and for recognizing, labeling and classifying fashion attributes of the at least one item.

* * * * *